(12) United States Patent
Lee

(10) Patent No.: US 11,985,296 B2
(45) Date of Patent: May 14, 2024

(54) DISPLAY DEVICE AND METHOD FOR CONTROLLING DISPLAY DEVICE

(71) Applicant: LG ELECTRONICS INC., Seoul (KR)

(72) Inventor: Yonguk Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/552,403

(22) PCT Filed: Jun. 2, 2021

(86) PCT No.: PCT/KR2021/006838
§ 371 (c)(1),
(2) Date: Sep. 25, 2023

(87) PCT Pub. No.: WO2022/255511
PCT Pub. Date: Dec. 8, 2022

(65) Prior Publication Data
US 2024/0098242 A1 Mar. 21, 2024

(51) Int. Cl.
*H04N 13/327* (2018.01)
*H04N 13/31* (2018.01)
*H04N 13/368* (2018.01)
*H04N 13/383* (2018.01)

(52) U.S. Cl.
CPC ........... *H04N 13/327* (2018.05); *H04N 13/31* (2018.05); *H04N 13/368* (2018.05); *H04N 13/383* (2018.05)

(58) Field of Classification Search
CPC .. H04N 13/327; H04N 13/368; H04N 13/383; H04N 13/31
USPC .......................................................... 348/51
See application file for complete search history.

(56) References Cited

U.S. PATENT DOCUMENTS

| 2013/0169529 A1* | 7/2013 | Ek ........................ H04N 13/376 345/697 |
| 2014/0071253 A1 | 3/2014 | de la Barre et al. |

FOREIGN PATENT DOCUMENTS

| KR | 20100091607 A * | 8/2010 | ............. G02B 27/22 |
| KR | 20110136324 A * | 12/2011 | ............. G02B 27/22 |
| KR | 10-2017-0044953 | 4/2017 | |
| KR | 10-2018-0072621 | 6/2018 | |
| KR | 10-2019-0029331 | 3/2019 | |

OTHER PUBLICATIONS

PCT International Application No. PCT/KR2021/006838, International Search Report dated Feb. 21, 2021, 3 pages.
Boev et al., "Stereoscopic Artifacts on Portable Auto-Stereoscopic Displays: What Matters?," In: Proceedings of the Fourth International Workshop on Video Processing and Quality Metrics Consumer Electronics, VPQM 2009, Arizona, Jan. 2009, 7 pages.

\* cited by examiner

*Primary Examiner* — Behrooz M Senfi
(74) *Attorney, Agent, or Firm* — LEE, HONG, DEGERMAN ,KANG & WAIMEY

(57) ABSTRACT

A display device according to embodiments, while relating to an autostereoscopic image display device and a control method therefor, may include a sensor, a display, a barrier, and a controller.

10 Claims, 11 Drawing Sheets

FIG. 4

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Case 1 | 0 | 0 | 0 | 0 | 0 | 0 | 0 | 0F | FF | FF | FF | FF | FF | 0F |
| Case 2 | 0F | 0 | 0 | 0 | 0 | 0 | 0 | 0 | 0F | FF | FF | FF | FF | FF |
| Case 3 | FF | 0F | 0 | 0 | 0 | 0 | 0 | 0 | 0 | 0F | FF | FF | FF | FF |
| Case 4 | FF | FF | 0F | 0 | 0 | 0 | 0 | 0 | 0 | 0 | 0F | FF | FF | FF |
| Case 5 | FF | FF | FF | 0F | 0 | 0 | 0 | 0 | 0 | 0 | 0 | 0F | FF | FF |
| Case 6 | FF | FF | FF | FF | 0F | 0 | 0 | 0 | 0 | 0 | 0 | 0 | 0F | FF |
| Case 7 | FF | FF | FF | FF | FF | 0F | 0 | 0 | 0 | 0 | 0 | 0 | 0 | 0F |
| Case 8 | 0F | FF | FF | FF | FF | FF | 0F | 0 | 0 | 0 | 0 | 0 | 0 | 0 |
| Case 9 | 0 | 0F | FF | FF | FF | FF | FF | 0F | 0 | 0 | 0 | 0 | 0 | 0 |
| Case 10 | 0 | 0 | 0F | FF | FF | FF | FF | FF | 0F | 0 | 0 | 0 | 0 | 0 |
| Case 11 | 0 | 0 | 0 | 0F | FF | FF | FF | FF | FF | 0F | 0 | 0 | 0 | 0 |
| Case 12 | 0 | 0 | 0 | 0 | 0F | FF | FF | FF | FF | FF | 0F | 0 | 0 | 0 |
| Case 13 | 0 | 0 | 0 | 0 | 0 | 0F | FF | FF | FF | FF | FF | 0F | 0 | 0 |
| Case 14 | 0 | 0 | 0 | 0 | 0 | 0 | 0F | FF | FF | FF | FF | FF | 0F | 0 |
| Case 15 | 0 | 0 | 0 | 0 | 0 | 0 | 0 | 0F | FF | FF | FF | FF | FF | 0F |

4220  4220F  422FF

DISPLAY DEVICE AND METHOD FOR CONTROLLING DISPLAY DEVICE

CROSS-REFERENCE TO RELATED APPLICATION(S)

This application is the National Stage filing under 35 U.S.C. 371 of International Application No. PCT/KR2021/006838, filed on Jun. 2, 2021, the contents of which is hereby incorporated by reference herein in its entirety.

TECHNICAL FIELD

Embodiments relate to a display device and a method for controlling the same. Specifically, the embodiments relate to an autostereoscopic 3D (dimensional) display device and a method for controlling the same.

BACKGROUND

To display an object in a more realistic and three-dimensional manner, a display device that displays a 3D (dimensional) stereoscopic image is appearing.

Conventionally, there was only a stereoscopic 3d display technique that recognizes the object as the 3D stereoscopic image using glasses along with the display device, but an autostereoscopic 3d display technique that may recognize the object as a 3D autostereoscopic image without using the separate glasses has appeared recently.

An autostereoscopic 3d display may provide the autostereoscopic image to a user by disposing an optical plate (hereinafter, referred to as a barrier) on a display panel to control light from pixels present on the display panel to generate a viewing area at an optimal viewing distance (OVD).

In this regard, the autostereoscopic 3d display identifies locations of user's left and right eyes and separates a left eye image and a right eye image from each other based on the locations of the left and right eyes to provide the autostereoscopic image.

SUMMARY

Technical Problem

However, as the user moves, the optimal viewing distance is not able to be provided based on the movement of the user, resulting in incomplete formation of the autostereoscopic image.

In addition, as the left eye image and the right eye image are separated from each other, defects (a line artifact and a line distortion) occur on the display.

Accordingly, a display device that separates the left eye image and the right eye image from each other based on the movement of the user is required.

In addition, a display device that does not generate the defects in the process of separating the left eye image and the right eye image from each other is required.

Technical Solutions

According to the embodiments, provided is a display device including a sensor that senses a location of a user, a display that includes a plurality of pixels and outputs an image, a barrier including a plurality of independent blocks, wherein each block includes a plurality of channels, and a controller that controls the sensor, the display, and the barrier, and the controller arranges the plurality of channels based on the location of the user, senses a boundary between a first block and a second block when there are the first block with the plurality of channels arranged in a first shape and the second block with the plurality of channels arranged in a second shape different from the first shape, calculates a location of a specific pixel corresponding to the boundary among the plurality of pixels, and performs correction on the specific pixel.

According to the embodiments, the controller may perform correction on the barrier corresponding to the boundary by rearranging the plurality of channels based on the sensed boundary.

According to the embodiments, the controller may calculate the location of the specific pixel via {(number of plurality of channels for each block)×(block number of boundary)+1}.

According to the embodiments, the controller may identify a luminance difference between the first block and the second block, and perform the correction on the specific pixel by performing compensation for the specific pixel by the luminance difference.

According to the embodiments, the controller may measure luminance of the plurality of channels, normalize each of the measured luminance to generate a compensation table, and identify the luminance difference based on the generated compensation table.

According to the embodiments, provided is a method for controlling a display device including: a display; and a barrier configured to control light irradiated onto the display and including a plurality of independent blocks, wherein each block includes a plurality of channels, the method including sensing, by a sensor, a location of a user, sensing, by a controller, a boundary between a first block and a second block when there are the first block with the plurality of channels arranged in a first shape and the second block with the plurality of channels arranged in a second shape different from the first shape, calculating, by the controller, a location of a specific pixel corresponding to the boundary among a plurality of pixels included in the display, and performing correction on the specific pixel.

According to the embodiments, the method may further include performing, by the controller, correction on the barrier corresponding to the boundary by rearranging the plurality of channels based on the sensed boundary.

According to the embodiments, the controller may calculate the location of the specific pixel via {(number of plurality of channels for each block)×(block number of boundary)+1}.

According to the embodiments, the performing of the correction on the specific pixel may include identifying, by the controller, a luminance difference between the first block and the second block, and performing compensation for the specific pixel by the luminance difference.

According to the embodiments, the identifying of the luminance difference may include measuring luminance of the plurality of channels, normalizing each of the measured luminance to generate a compensation table, and identifying the luminance difference based on the generated compensation table.

Advantageous Effects

The display device and the method for controlling the display device according to the embodiments may provide the image at the optimal viewing distance (OVD) of the user based on the movement of the user.

The display device and the method for controlling the display device according to the embodiments may separate the left eye image and the right eye image from each other.

The display device and the method for controlling the display device according to the embodiments may minimize the defects (the line distortion or the line artifact) occurred on the display.

BRIEF DESCRIPTION OF THE DRAWINGS

FIG. 4 illustrates a driving method of blocks according to embodiments.

DETAILED DESCRIPTION

Figure 1:
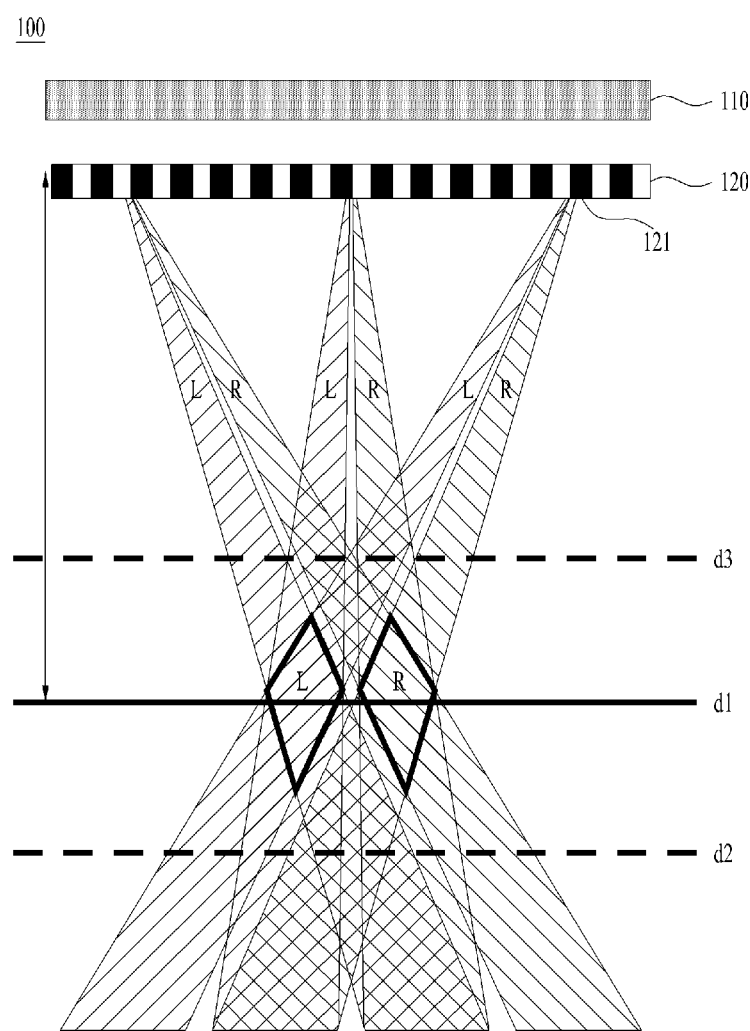
FIG. 1 schematically illustrates a display device according to embodiments.

Hereinafter, the embodiments will be described in detail with reference to the accompanying drawings, but the same or similar components will be assigned the same reference numerals regardless of reference numerals, and redundant descriptions thereof will be omitted. In describing the embodiments, if it is determined that a detailed description of related known technologies may obscure the gist of the embodiment, the detailed description will be omitted. In addition, the accompanying drawings are only for easy understanding of the embodiments, and should not be construed as limiting the technical idea by the accompanying drawings.

Also, when an element such as a layer, region or substrate is referred to as being "on" another element, this means that it is directly on the other element or an intermediate element may exist between them.

Terms such as first and second may be used to describe various components of the embodiments. However, interpretation of various components according to embodiments should not be limited by the above terms. These terms are only used to distinguish one component from another. For example, a first user input signal may be referred to as a second user input signal. Similarly, the second user input signal may be referred to as the first user input signal. Use of these terms should be construed as not departing from the scope of the various embodiments. Although both the first user input signal and the second user input signal are user input signals, they do not mean the same user input signals unless the context clearly indicates otherwise.

Terms used to describe the embodiments are used for the purpose of describing specific embodiments, and are not intended to limit the embodiments. As used in the description of the embodiments and in the claims, the singular is intended to include the plural unless the context clearly dictates otherwise. The expression "and/or" is intended to include all possible combinations between the terms. The expression "comprises" describes that there are features, numbers, steps, elements, and/or components, and means not including additional features, numbers, steps, elements, and/or components. Conditional expressions such as "if" and "when" used to describe the embodiments are not limited to optional cases. When a specific condition is satisfied, a related action is performed in response to the specific condition, or a related definition is intended to be interpreted.

The display device described through the embodiments is a concept including all display devices that display information in unit pixels or a set of unit pixels. Therefore, it can be applied not only to products but also to parts. For example, a panel corresponding to one part of a digital TV independently corresponds to a display device in this specification. The products include mobile phones, smart phones, laptop computers, digital broadcasting terminals, PDA (personal digital assistants), PMP (portable multimedia player), navigation, Slate PC, Tablet PC, Ultra Books, digital TVs, desktop computers, etc. However, those skilled in the art will readily recognize that the configuration according to the embodiments may be applied to a device capable of displaying even a new product type to be developed in the future.

FIG. 1 schematically illustrates a display device according to embodiments.

A display device 100 according to embodiments may include a display 110 and a barrier 120 that controls light irradiated onto the display 110.

The display 110 according to the embodiments may be disposed at a front surface of the display device 100. The display 110 may include a plurality of pixels. The display 110 may output an image via the plurality of pixels. That is, the display 110 may output the image via light emitted from the plurality of pixels.

The barrier 120 according to the embodiments may be disposed on at least one of a front surface and a rear surface of the display 110 to control light irradiated onto the display 110.

The barrier 120 according to the embodiments may include a plurality of channels 121 to control light irradiated onto the display 110. The barrier 120 may shift the plurality of channels 121 to provide separate images reflected on both eyes of a user. In this regard, even when the plurality of channels 121 are shifted, the barrier 120 may maintain the same total pitch, which is a sum of spacings (hereinafter, referred to as 'pitches') between the plurality of channels 121.

That is, the barrier 120 according to the embodiments may provide an autostereoscopic image by dividing the image output from the display 110 into binocular images based on a movement of the user.

As shown in FIG. 1, the display device 100 may separately provide a left eye image L and a right eye image R.

In this regard, the user may be located at a distance from the display device 100 by d1. The d1 may be an optimal viewing distance (OVD).

The optimal viewing distance may refer to a distance at which an effect of a resolution of the display device 100 is maximally viewed. Accordingly, the d1 may correspond to a distance at which the autostereoscopic image is most clearly provided from the display device 100 according to the embodiments.

In this regard, at the d1 corresponding to the optimal viewing distance, viewing diamonds L and R generated when the binocular images reach normally may be generated.

The display device 100 according to the embodiments may provide the autostereoscopic image even at a distance other then the d1. For example, even when the user is located at a distance d2 or d3 away from the display device 100, the autostereoscopic image provided by the display device 100 may be provided.

However, at a distance other than the optimal viewing distance such as the d1, a crosstalk (X-talk) phenomenon in which the binocular images are not properly separated from each other may occur. The X-talk phenomenon refers to a phenomenon in which the left eye image and the right eye image are mixed with each other and an image of one side is viewed on the other side. When the X-talk phenomenon occurs, sharpness of the autostereoscopic image may be degraded.

Therefore, a method for solving such problem will be described in detail below.

Figure 2:
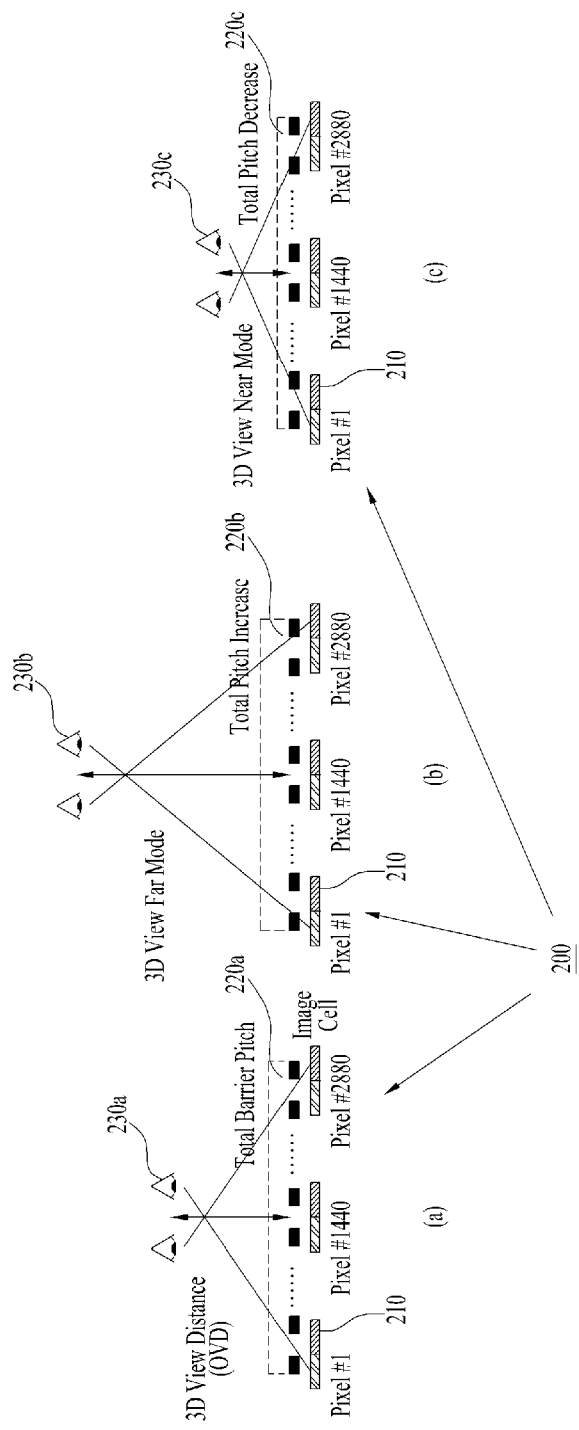
FIG. 2 schematically illustrates a display device according to embodiments.

FIG. 2 schematically illustrates a display device according to embodiments.

A display device 200 (e.g., the display device described in FIG. 1) according to the embodiments may include a display 210 (e.g., the display described in FIG. 1) and barriers 220a, 220b, and 220c (e.g., the barrier described in FIG. 1) that control light irradiated onto the display 210.

The barriers 220a, 220b, and 220c according to the embodiments may include a plurality of channels (e.g., the channels described in FIG. 1) to control light irradiated onto the display 110. The barriers 220a, 220b, and 220c may shift the plurality of channels to provide separate images reflected on both eyes of the user. In this regard, the barriers 220a, 220b, and 220c may appropriately increase or decrease the total pitch while shifting the plurality of channels.

Specifically, the barriers 220a, 220b, and 220c according to the embodiments may change the location where the viewing diamonds are generated by adjusting the total pitch based on locations of users 230a, 230b, and 230c. When the users 230a, 230b, and 230c are located at locations at distances greater than the optimal viewing distance from the display device 200, the barriers 220a, 220b, and 220c may reduce the total pitch, and when the users 230a, 230b, and 230c are located at locations at distances smaller than the optimal viewing distance from the display device 200, the barriers 220a, 220b, and 220c may increase the total pitch.

That is, the barriers 220a, 220b, and 220c according to the embodiments may provide the users with the image in which the binocular images are normally separated from each other by adjusting the location where the viewing diamonds are generated.

(a) in FIG. 2 shows a diagram in which the user 230a is positioned at the optimal viewing distance (e.g., the distance of d1 described in FIG. 1).

As shown in (a) in FIG. 2, the user 230a may observe the display device 200 at the optimal viewing distance inherent in the display device 200.

In this case, the barrier 220a may form the viewing diamonds at the optimal viewing distance without adjusting the total pitch. That is, the user 230a may view the image in which the binocular images are normally separated from each other.

(b) in FIG. 2 shows a diagram in which the user 230b is located at the distance (e.g., the distance of d2 described in FIG. 1) greater than the optimal viewing distance from the display device 200.

As shown in (b) in FIG. 2, the user b may observe the display device 200 at the distance greater than the optimal viewing distance inherent in the display device 200.

In this case, the barrier 220b may adjust the total pitch to form the viewing diamonds for the corresponding distance at which the user 230b is located. That is, the barrier 220b may separate the images reflected on both eyes of the user by reducing the total pitch. That is, even when the user 230b is located at the distance greater than the optimal viewing distance, the user 230b may view the image in which the binocular images are normally separated from each other.

(c) in FIG. 2 shows a diagram in which the user 230c is located at the distance (e.g., the distance of d3 described in FIG. 1) smaller than the optimal viewing distance from the display device 200.

As shown in (c) in FIG. 2, the user 230c may observe the display device 200 at the distance smaller than the optimal viewing distance inherent in the display device 200.

In this case, the barrier 220c may adjust the total pitch to form the viewing diamonds at the corresponding distance at which the user 230c is located. That is, the barrier 220c may increase the total pitch to separate the images reflected on both eyes of the user. That is, even when the user 230c is located at the distance smaller than the optimal viewing distance, the user 230c may view the image in which the binocular images are normally separated from each other.

Hereinafter, a configuration of the barrier for adjusting the total pitch will be described in detail.

Figure 3:
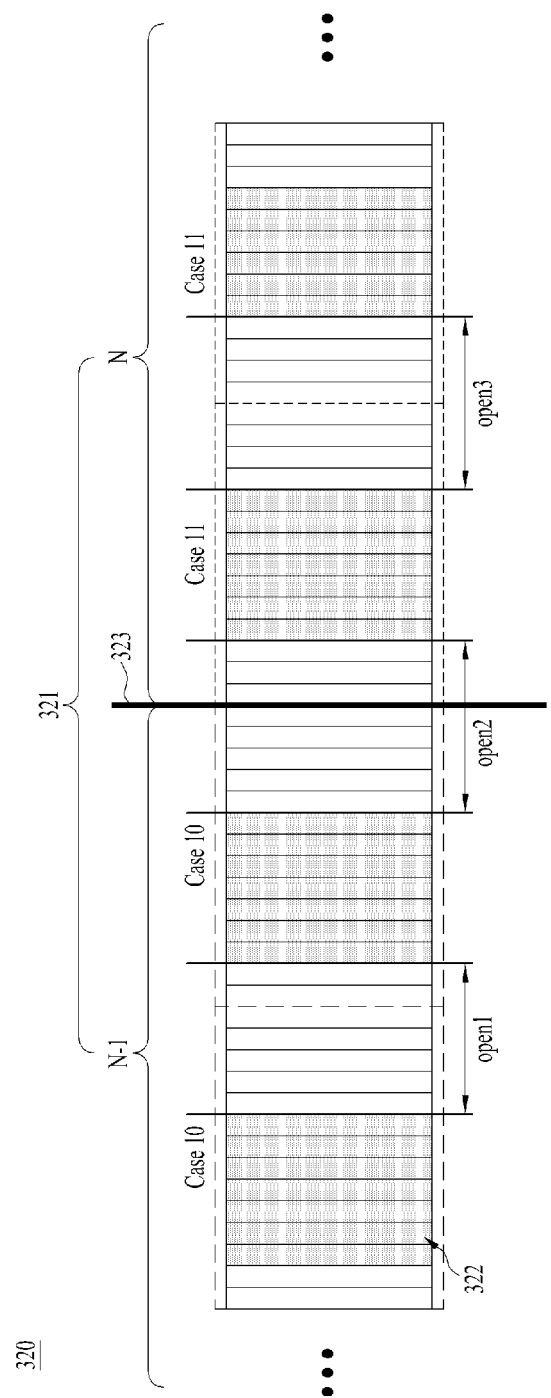
FIG. 3 schematically illustrates a configuration of a barrier according to embodiments.

FIG. 3 schematically illustrates a configuration of a barrier according to embodiments.

A display device (e.g., the display device described in FIGS. 1 and 2) according to the embodiments may include a display (e.g., the display described in FIGS. 1 and 2) and a barrier 320 (e.g., the barrier described in FIGS. 1 and 2) that controls light irradiated onto the display.

The barrier 320 according to the embodiments may include a plurality of blocks 321. The plurality of blocks 321 may be driven independently of each other. Accordingly, the barrier 320 may increase or decrease the total pitch. The plurality of blocks 321 according to the embodiments may include a plurality of channels 322 (e.g., the channels described in FIGS. 1 and 2).

Therefore, the barrier 320 according to the embodiments may include the plurality of blocks 321 that are driven independently of each other, and each of the blocks 321 may include the plurality of channels 322 that are physically constructed and driven by an input driving scheme. In this regard, for convenience, the input driving scheme is referred to as a case. Hereinafter, the driving scheme of the plurality of channels will be described.

FIG. 3 shows, for example, an N–1th block and an Nth block in the barrier 320 including the plurality of blocks 321.

As shown in FIG. 3, the N–1th block may be driven based on the input driving scheme. That is, based on the input driving scheme, some of the channels 322 included in the N–1th block may be in an open state and the rest may be in a closed state. The open state of the channel 322 is shown without shadows, and the closed state of the channel 322 is shown with the shadows. For example, the driving scheme input to the N–1th block may be Case 10.

In addition, as shown in FIG. 3, the Nth block may be driven based on the input driving scheme, and similarly, based on the input driving scheme, some of the channels 322 included in the Nth block may be in the open state and the rest may be in the closed state. For example, the driving scheme input to the Nth block may be Case 11.

Hereinafter, the states of the channels 322 based on the driving scheme of the blocks 321 will be described in detail.

FIG. 4 illustrates a driving method of blocks according to embodiments.

FIG. 4 is an example showing a driving scheme of proposed blocks (e.g., the blocks described in FIG. 3).

In FIG. 4, 1 to 14 represent a plurality of channels (e.g., the channels described in FIGS. 1 to 3), and Cases 1 to 14 represent a driving scheme (e.g., the driving scheme described in FIG. 3) of the plurality of channels.

In addition, in FIG. 4, an unshaded O 422O represents an open channel, and indicates a state in which no voltage is applied to the channel. In addition, a shaded FF 422FF represents a closed channel and indicates a state in which the voltage is applied to the channel. A shaded OF 422OF represents a state in which the voltage is applied or not applied and indicates a varying state (smooth voltage), and is treated the same as the closed channel for convenience because the voltage is being applied.

The channels according to the embodiments may be driven based on the Case 1 to Case 14 that are determined to be necessary. For example, the channels may be driven based on the Case 1 to Case 14 depending on the location of the user. However, this is merely an example, and the cases are able to be formed as many as the number of channels. In addition, the number of blocks (e.g., the blocks described in FIG. 3) and the number of channels included in each of the blocks are not limited thereto.

For example, channels following the driving scheme of the Case 10 may be sequentially operated such that 2 are in the open state, 7 are in the closed state, and 5 are in the open state. In addition, for example, channels following the driving scheme of the Case 11 may be sequentially operated such that 3 are in the open state, 7 are in the closed state, and 4 are in the open state. That is, the Case 10 and the Case 11 both correspond to a driving scheme that makes 7 channels in the open state and 7 channels in the closed state, but an order of opening and closing the channels may be different. In this regard, when 1 block includes n channels (n is an integer greater than 0), a case in which m channels (m is an integer greater than 0 and equal to or smaller than n) among the n channels form one pattern may be formed.

As such, a barrier (e.g., the barrier described in FIGS. 1 to 3) according to the embodiments may drive the blocks based on the Cases (the Case 1 to the Case 14) to control light emitted from a display (e.g., the display described in FIGS. 1 to 2) based on a location of a driver.

That is, for example, the channels may be driven based on the cases (the Case 1 to the Case 14) sequentially selected based on the location of the driver. Specifically, the channels may be driven by the cases (the Case 1 to the Case 14) sequentially selected based on a location of driver's eyes. Accordingly, the total pitch may be varied.

For example, among n channels (where n is an integer equal to or greater than 14) included in the blocks shown in FIG. 3, 14 channels may form one pattern. That is, the channels may be driven such that every 14 channels among the n channels have a case of the same pattern.

For example, the channels included in the N−1th block shown in FIG. 3 may be operated based on the Case 10. Accordingly, among the channels included in the N−1th block, 2 open channels, 7 closed channels, and 5 open channels of the 14 channels may be sequentially arranged.

In addition, for example, the channels included in the Nth block shown in FIG. 3 may be operated based on the Case 11. Accordingly, among the channels included in the Nth block, 3 open channels, 7 closed channels, and 4 open channels of the 14 channels may be sequentially arranged.

Therefore, for example, as shown in FIG. 3, the N−1th block and the Nth block may have 7 open channels (open 1 and open 3), respectively.

However, as the Case 10 moves sequentially to the Case 11, as shown in FIG. 3, channels located between the Case 10 and the Case 11 are open (open 2). Between the N−1th block and the Nth block, the number of open channels may be different. That is, at a boundary where the number of open channels is different, a line artifact (a line distortion) may occur.

Figure 5:
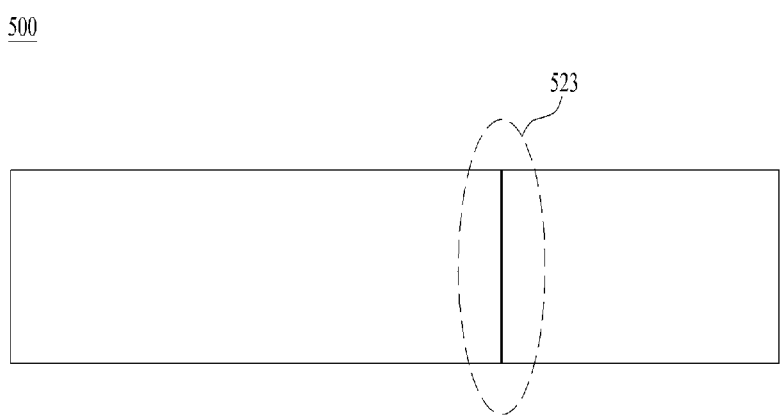
FIG. 5 shows a line artifact.

FIG. 5 shows a line artifact (a line distortion).

A display device 500 (e.g., the display device described in FIGS. 1 to 3) according to embodiments may include a display (e.g., the display described in FIGS. 1 to 3) and a barrier (e.g., the barrier described in FIGS. 1 to 4) that controls light irradiated onto the display.

Therefore, the barrier according to the embodiments may include a plurality of blocks (e.g., the blocks described in FIGS. 3 and 4) that are driven independently of each other, and each block may include a plurality of channels (e.g., the channels described in FIGS. 1 to 4) physically constructed and driven by an input driving scheme.

As described above in FIG. 4, the barrier according to the embodiments may have a line artifact 523 at a boundary (e.g., the boundary described in FIG. 4) where the number of open channels is different. That is, there is a problem in that the line artifact 523 is generated on the display.

Therefore, hereinafter, a method for solving the problem of the line artifact 523 will be described in detail.

Figure 6:
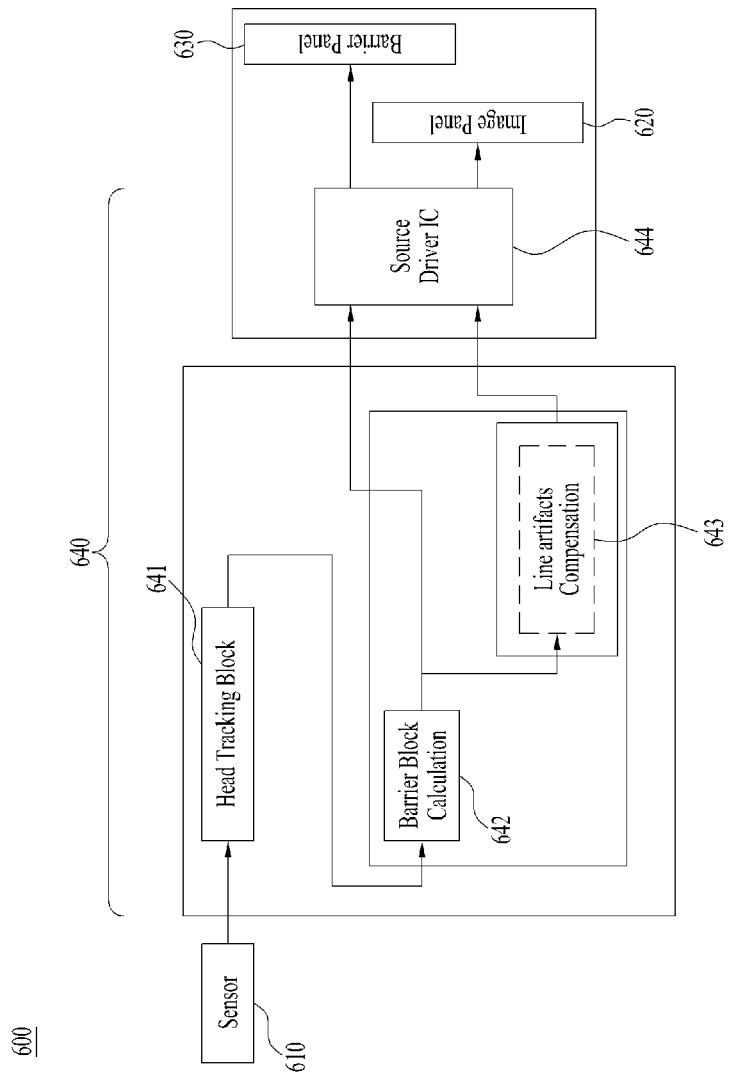
FIG. 6 schematically illustrates a configuration of a display device according to embodiments.

FIG. 6 schematically illustrates a configuration of a display device according to embodiments.

A display device 600 (e.g., the display device described in FIGS. 1 to 3 and 5) according to embodiments may include a sensor 610, a display 620 (e.g., the display described in FIGS. 1 to 3 and 5), a barrier 630 (e.g., the barrier described in FIGS. 1 to 5), and a controller 640 that controls the sensor 610, the display 620, and the barrier 630.

In this regard, the display 620 according to the embodiments may be disposed at a front surface of the display device 600. The display 620 may include a plurality of pixels. The display 620 may output an image via the plurality of pixels. That is, the display 620 may output the image via light emitted from the plurality of pixels.

In addition, the barrier 630 according to the embodiments may include a plurality of blocks (e.g., the blocks described in FIGS. 3 to 5) that are driven independently of each other, and each block may include a plurality of channels (e.g., the channels described in FIGS. 1 to 5) that are physically constructed and driven in an input driving scheme.

In the display device 600 according to the embodiments, the controller 640 may correct the display 620 and/or the barrier 630 based on a location of a user sensed via the sensor 610, thereby solving the above-described problem of the line artifact. This will be described in detail below.

The sensor 610 according to the embodiments may include at least one sensor for sensing at least one of user information and/or environmental information obtainable by the display device 600. Specifically, the sensor 610 may sense the location of the user, specifically, a location of a user's head, and more specifically, a location of user's both eyes.

The sensor 610 according to the embodiments may include, for example, at least one of a proximity sensor, an illuminance sensor, a touch sensor, an acceleration sensor, a magnetic sensor, a gravity sensor, a gyroscope sensor, a motion sensor, an RGB sensor, an infrared sensor, a fingerprint recognition sensor, an ultrasonic sensor, a light sensor, an environmental sensor (e.g., a barometer, a hygrometer, a thermometer, a radioactivity sensor, a heat sensor, a gas sensor, and the like), a chemical sensor (e.g., a health care sensor, a biometric sensor, and the like).

Furthermore, the sensor 610 according to the embodiments may further include an imaging device such as a camera, and may obtain the user information via an image or/and a video. However, the sensor 610 may not be limited thereto and may include any device for identifying the user information.

The controller 640 according to the embodiments may include at least one of a head tracking block 641 for obtaining location information of the user, a barrier block calculator 642 for calculating a location of a boundary (e.g., the boundary described in FIGS. 3 to 5) based on the location information of the user, a line artifact compensator 643 for controlling the display 630 based on the location information of the user and the barrier block calculation, and/or a driver 624 for controlling the display 620 and the barrier 630.

The head tracking block 641 according to the embodiments may receive at least one of the environment information and/or the user information sensed by the sensor 610. The head tracking block 641 may determine the user location information based on the sensed environment information and/or user information. For example, the head tracking block 641 may sense the location of the user's head and, for example, the location of both eyes of the user.

The head tracking block 641 according to the embodiments may transfer the determined user location information to the barrier block calculator 642. However, the present disclosure may not be limited thereto, and the head tracking block 641 may directly transfer the determined user location information to the line artifact compensator 643, the display 620, and/or the barrier 630.

The barrier block calculation unit 642 according to the embodiments may calculate the location of the boundary based on the user location information.

Specifically, when there are a first block in which a plurality of channels are arranged in a first shape and a second block in which a plurality of channels are arranged in a second shape different from the first shape, the barrier block calculator 642 according to the embodiments may calculate a boundary between the first block and the second block.

Specifically, when there are the first block in which the plurality of channels are operated in a first driving scheme and a second block in which the plurality of channels are operated in a second driving scheme different from the first driving scheme, the barrier block calculator 642 according to the embodiments may calculate the boundary between the first block and the second block.

In addition, the barrier block calculator 642 according to the embodiments may derive a block number of the boundary. The block number of the boundary may be, for example, N-1 in the case of FIG. 3. That is, the barrier block calculator 622 may calculate a light reaching area that is different for each viewing point.

The barrier block calculator 642 according to the embodiments may transfer information on the boundary including the block number to the driver 644.

The driver 644 according to the embodiments may control the barrier 630 based on the information on the boundary. That is, the driver 644 may perform correction on the plurality of channels based on the information on the boundary.

It is illustrated in FIG. 6 that one driver 644 controls both the display 620 and the barrier 630, but the present disclosure is not limited thereto, and two drivers 644 are able to control the display 620 and the barrier 630, respectively. In this case, the driver that controls the display 620 may receive information on a specific pixel from the line artifact compensator 643 and drive and/or correct the display 620. In addition, the driver that controls the barrier 630 may receive the information on the boundary from the head tracking block 641 and/or the barrier block calculator 642 to drive and/or correct the barrier 630.

The barrier block calculator 622 according to the embodiments may calculate a location of a pixel corresponding to the block number of the boundary based on the block number of the boundary. That is, the barrier block calculator 622 may calculate a location of a specific pixel corresponding to the boundary. The barrier block calculator 622 may transfer location information of the specific pixel to the line artifact compensator 643.

The line artifact compensator 643 according to the embodiments may identify a luminance difference between the specific pixel and a remaining arbitrary pixel. The line artifact compensator 643 may transfer the location information of the specific pixel and information on the identified luminance difference to the driver 644.

The driver 644 according to the embodiments may control the display 620 based on the information on the specific pixel and the information on the luminance difference. That is, the driver 644 may perform the correction on one or more pixels based on the information on the luminance difference.

Hereinafter, the calculation of the boundary and the performing of the correction on the barrier 630 corresponding to the calculated boundary and the display 640 will be described in detail.

Figure 7:
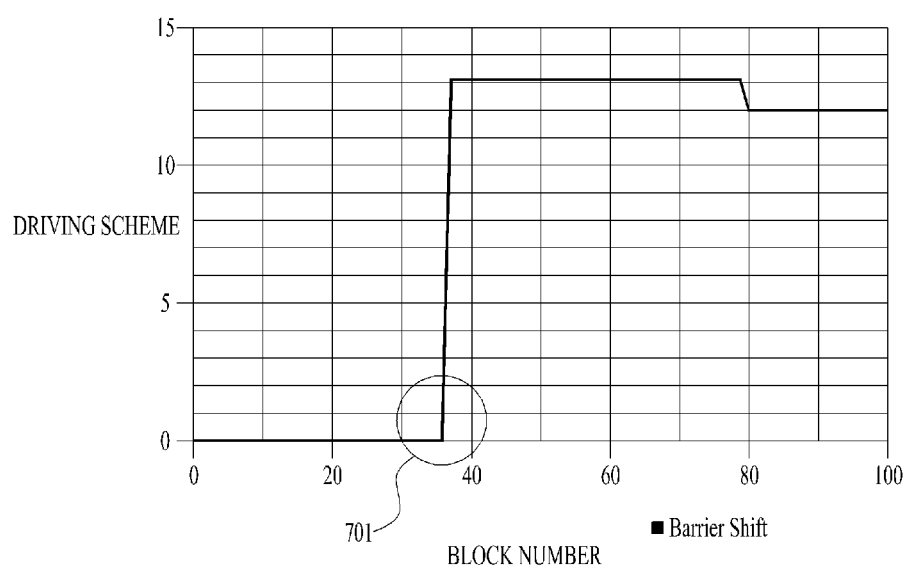
FIG. 7 is a diagram for calculating a location of a boundary and a specific pixel according to embodiments.

FIG. 7 is a diagram for calculating a location of a boundary and a specific pixel according to embodiments.

A display device (e.g., the display device described in FIGS. 1 to 3 and 5 to 6) according to embodiments may include a sensor (e.g., the sensor described in FIG. 6), a display (e.g., the display described in FIGS. 1 to 3 and 5 to 6), a barrier (e.g., the barrier described in FIGS. 1 to 6) that controls light irradiated onto the display, and a controller (e.g., the controller described in FIG. 6) that controls the sensor, the display, and the barrier.

The controller according to the embodiments may include a barrier block calculator (e.g., the barrier block calculator described in FIG. 6) that calculates a location of a boundary (e.g., the boundary described in FIGS. 3 to 6) based on location of a user obtained by a head tracking block (e.g., the head tracking block described in FIG. 6).

The barrier block calculator according to the embodiments may calculate the location of the boundary based on the input location information of the user.

For example, the barrier according to the embodiments may have a plurality of independent blocks (e.g., the blocks described in FIGS. 3 to 6).

In FIG. 7, an x-axis represents block numbers (e.g., the block number described in FIG. 6) for the plurality of independent blocks. In addition, in FIG. 7, a y-axis represents a driving scheme (e.g., the case described in FIGS. 3 to 4) of each channel (e.g., the channels described in FIGS. 1 to 6) included in the independent block.

That is, FIG. 7 shows an example of the display device in which the barrier according to the embodiments has the plurality of (100) independent blocks, and each block has 24 channels.

For example, as shown in FIG. 7, setting values of respective channels may be output for the total of 100 independent blocks. Blocks with channel changes between blocks may be output via the output graph and/or the output value, and the corresponding portion may be referred to as a boundary 701 (e.g., the boundary described in FIGS. 3 to 6).

The barrier block calculator according to the embodiments may derive a block number (e.g., the block number described in FIG. 6) of the boundary 701. For example, as shown in FIG. 7, because the boundary 701 is located between block numbers 37 and 38, the block number of the boundary 701 may be 37.

The barrier block calculator according to the embodiments may calculate a location of a specific pixel (e.g., the specific pixel described in FIG. 6) via the block number of the boundary 701.

Specifically, the location of the specific pixel may be calculated via {(number of plurality of channels for each block)×(block number of boundary)+1}.

For example, in the case of FIG. 7, it may be seen that the specific pixel corresponding to the boundary 701 is a pixel located at a number of 889 based on 24×37+1.

With such method, a location where a line artifact has occurred on the display may be accurately identified.

Figure 8:
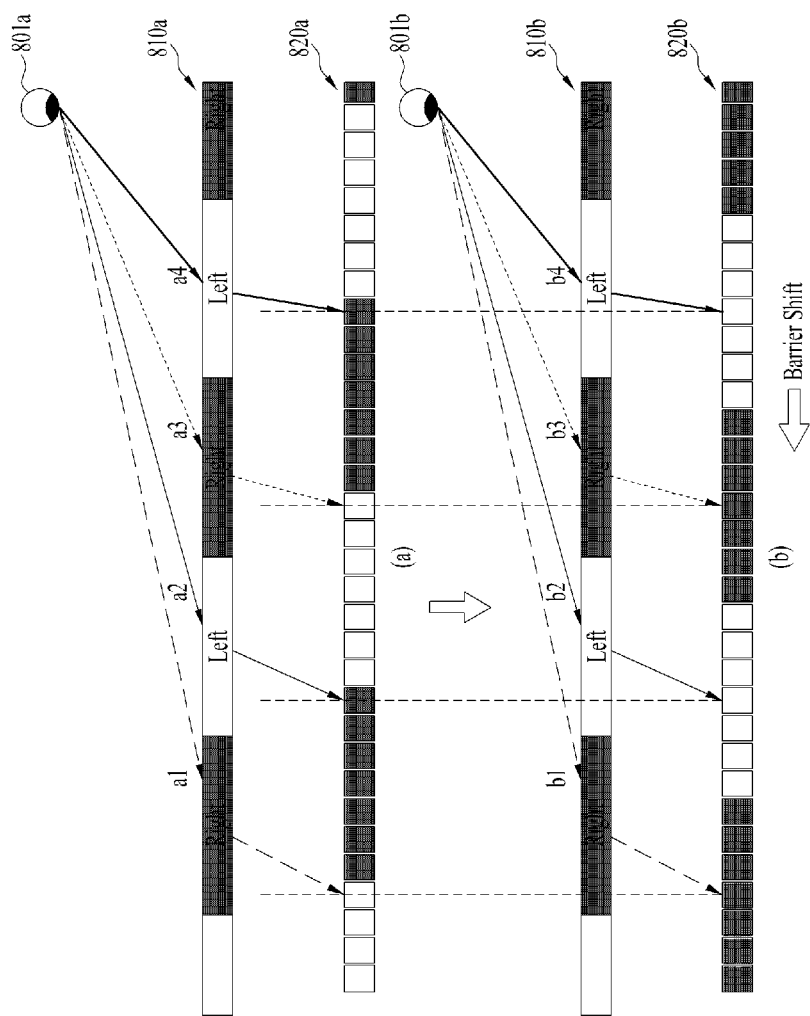
FIG. 8 shows a diagram of correcting a barrier according to embodiments.

FIG. 8 shows a diagram of correcting a barrier according to embodiments.

A display device (e.g., the display device described in FIGS. 1 to 3 and 5 to 7) according to the embodiments may include a sensor (e.g., the sensor described in FIGS. 6 to 7), displays 810a and 810b (e.g., the display described in FIGS. 1 to 3 and 5 to 7), barriers 820a and 820b (e.g., the barrier described in FIGS. 1 to 7) that control light irradiated onto the display, and a controller (e.g., the controller described in FIGS. 6 and 7) that controls the sensor, the displays, and the barriers.

The controller according to the embodiments may include a driver (e.g., the driver described in FIG. 6) that controls the displays 810a and 810b and the barriers 820a and 820b.

The driver according to the embodiments may perform correction on a plurality of channels (e.g., the channels described in FIGS. 1 to 7) based on information on a boundary (e.g., the boundary described in FIGS. 3 to 7). Specifically, the driver may apply a voltage to the plurality of channels to enable separation of both binocular images.

In FIG. 8, user's eyes 801a and 801b represent a user's left eye. In addition, in the barriers 820a and 820b, shaded portions represent a closed state of channels, and unshaded portions represent an open state of channels.

(a) in FIG. 8 shows a state before performing correction on the barrier 820a corresponding to a boundary (e.g., the boundary described in FIGS. 3 to 7).

As shown in (a) in FIG. 8, it may be seen that light to reach the user's left eye 801a are a2 and a4. However, because channels of the barrier 820a through which the a2 and the a4 pass are closed, the a2 and the a4 are not able to reach the user's left eye 801a.

As such, there is a problem in that a line artifact occurs because the barrier 820a is not able to calculate an actual location of the user in real time.

(b) in FIG. 8 shows a state in which correction on the barrier 820b corresponding to the boundary has been performed.

As shown in (b) of FIG. 8, it may be seen that light to reach the user's left eye 802b are b2 and b4. A driver according to the embodiments may shift the barrier 820b based on areas where light reach.

As such, the driver according to the embodiments may shift the barrier 820b based on locations of light b2 and b4 to reach the left eye 802b, thereby preventing a problem that the line artifact occurs by the barrier 820b.

Figure 9:
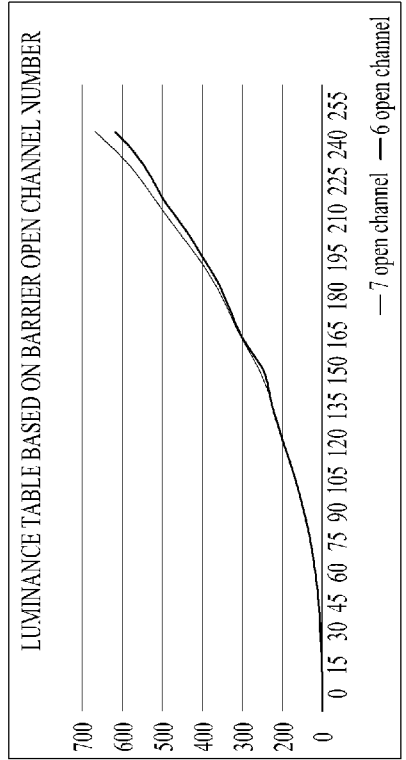
FIG. 9 is a diagram of performing correction on a display according to embodiments.
Figure 9:
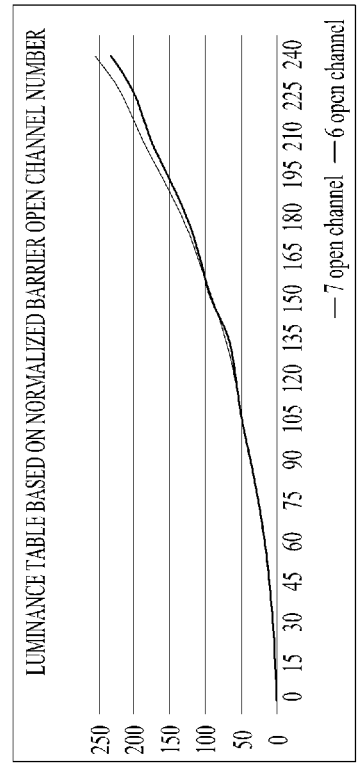
Figure 9:
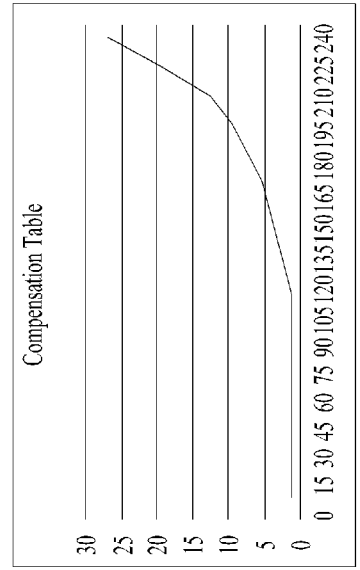

FIG. 9 is a diagram of performing correction on a display according to embodiments.

A display device (e.g., the display device described in FIGS. 1 to 3 and 5 to 8) according to the embodiments may include a sensor (e.g., the sensor described in FIGS. 6 to 8), a display (e.g., the display described in FIGS. 1 to 3 and 5 to 8), a barrier (e.g., the barrier described in FIGS. 1 to 8) that controls light irradiated onto the display, and a controller (e.g., the controller described in FIGS. 6 to 8) that controls the sensor, the display, and the barrier.

The controller according to the embodiments may include at least one of a line artifact compensator (e.g., the line artifact compensator described in FIG. 6) that controls the display based on location information of a user and barrier block calculation, and/or a driver (e.g., the driver described in FIGS. 6 and 8) that controls the display and the barrier.

The line artifact compensator according to the embodiments may measure a luminance of each block for a plurality of blocks (e.g., the blocks described in FIGS. 3 to 7). That is, the line artifact compensator may measure luminance in each of the channels (e.g., the channels described in FIGS. 1 to 8) included in the plurality of blocks.

In addition, the line artifact compensator may measure and compare luminance of blocks where a boundary (e.g., the boundary described in FIGS. 3 to 8) is located therebetween with luminance of blocks where no boundary is located. In addition, the line artifact compensator may identify a luminance difference based on whether the boundary is located and generate a compensation table based on the luminance difference.

FIG. 9 is a graph showing a display device having 24 channels for each block in a barrier having 100 blocks. In this regard, 12 channels may operate for each case (e.g., the case described in FIGS. 3 to 4 and 7) of one barrier pattern.

As shown in (a) in FIG. 9, the line artifact compensator may measure luminance of a portion having 6 open channels and a portion having 7 open channels. In this regard, it may be seen that the luminance of the portion having the 7 open channels is greater than that of the portion having the 6 open channels.

As shown in (b) in FIG. 9, the line artifact compensator may normalize each measured luminance. For example, a line artifact compensator may normalize the measured luminance at a 255 gray level.

As shown in (c) in FIG. 9, the line artifact compensator may generate the compensation table for the normalized luminance. That is, the line artifact compensator may generate the compensation table for compensating for the luminance difference based on a difference between the normalized luminance.

The line artifact compensator according to the embodiments may transfer information on a specific pixel including the generated compensation table to the driver.

Accordingly, the driver according to the embodiments may remove a line artifact by compensating for the luminance difference for the specific pixel.

Figure 10:
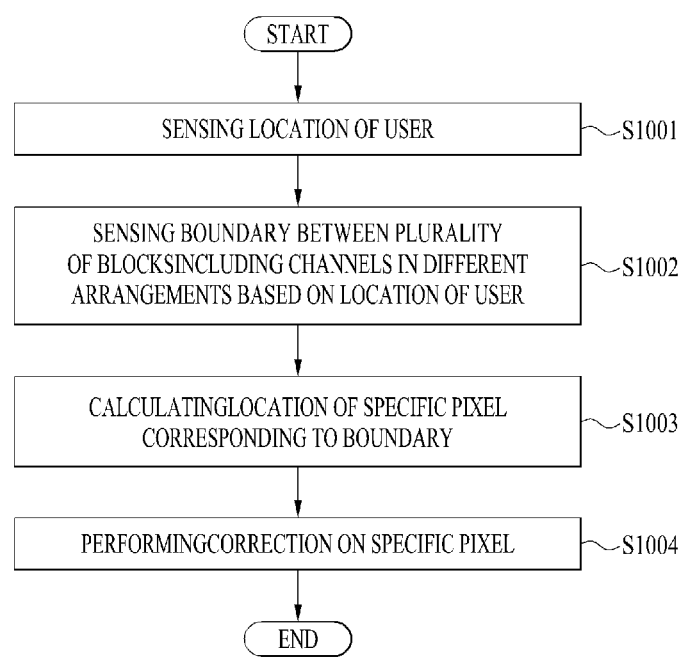
FIG. 10 is a flowchart of a method for controlling a display device according to embodiments.

FIG. 10 is a flowchart of a method for controlling a display device according to embodiments.

A method for controlling a display device according to embodiments may be executed by a sensor (e.g., the sensor described in FIGS. 6 to 9), a display (e.g., the display described in FIGS. 1 to 3 and 5 to 9), a barrier (e.g., the barrier described in FIGS. 1 to 9), and controller (e.g., the controller described in FIGS. 6 to 9) included in a display device (e.g., the display device described in FIGS. 1 to 3 and 5 to 9).

The barrier according to the embodiments may include a plurality of independent blocks (e.g., the blocks described in FIGS. 3 to 7 and 9). In this regard, each of the plurality of independent blocks may include a plurality of channels (e.g., the channels described in FIGS. 1 to 9).

The method for controlling the display device according to the embodiments may include sensing, by the sensor, a location of a user (s1001).

The method for controlling the display device according to the embodiments may include sensing, by the controller, a boundary (e.g., the boundary described in FIGS. 3 to 9) between a first block and a second block when there are the first block in which a plurality of channels are arranged in a first shape and the second block in which a plurality of channels are arranged in a second shape (s1002). Specifically, the controller may sense the boundary at which the number of open channels is different between blocks.

The method for controlling the display device according to the embodiments may include calculating, by the controller, a location of a specific pixel corresponding to the boundary (s1003). Specifically, the controller may calculate the location of the specific pixel, which is a pixel corresponding to the boundary, on the display. Specifically, the controller may calculate the location of the specific pixel via {(number of plurality of channels for each block)×(block number of boundary)+1}.

The method for controlling the display device according to the embodiments may include performing, by the controller, correction on the specific pixel (s1004).

Accordingly, the display device according to the embodiments may provide an autostereoscopic 3D image without a line artifact.

Figure 11:
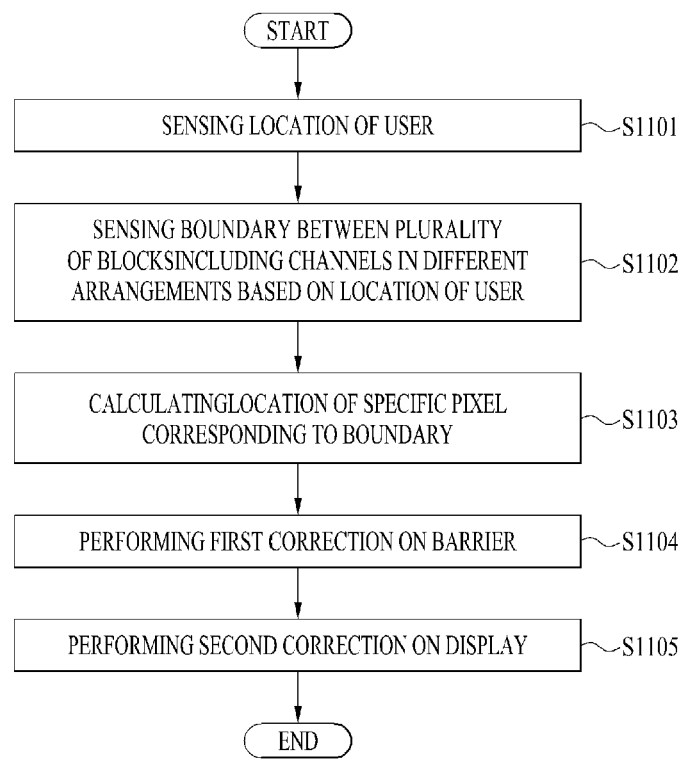
FIG. 11 is a flowchart of a method for controlling a display device according to embodiments.

FIG. 11 is a flowchart of a method for controlling a display device according to embodiments.

A method for controlling a display device (e.g., the method for controlling the display device described in FIG. 10) according to the embodiments may be executed by a sensor (e.g., the sensor described in FIGS. 6 to 10), a display (e.g., the display described in FIGS. 1 to 3, and 5 to 10), a barrier (e.g., the barrier described in FIGS. 1 to 10), and a controller. (e.g., the controller described in FIGS. 6 to 10) included in a display device (e.g., the display device described in FIGS. 1 to 3 and 5 to 10).

The barrier according to the embodiments may include a plurality of independent blocks (e.g., the blocks described in FIGS. 3 to 7 and 9 to 10). In this regard, each of the plurality of independent blocks may include a plurality of channels (e.g., the channels described in FIGS. 1 to 10).

The method for controlling the display device according to the embodiments may include sensing, by the sensor, a location of a user (s1101) (e.g., s1001 described in FIG. 10).

The method for controlling the display device according to the embodiments may include sensing, by the controller, a boundary (e.g., the boundary described in FIGS. 3 to 10) based on the location of the user (s1102) (e.g., s1002 described in FIG. 10).

The method for controlling the display device according to the embodiments may include calculating, by the controller, a location of a specific pixel corresponding to the boundary (s1103) (e.g., s1003 described in FIG. 10).

The method for controlling the display device according to the embodiments may include performing, by the controller, first correction on the barrier (s1104). Specifically, the controller may perform the correction on the boundary by rearranging the plurality of channels based on the sensed boundary. The order of s1103 and s1104 may be reversed.

The method for controlling the display device according to the embodiments may include performing, by the controller, second correction on the display (s1105) (e.g., s1004 described in FIG. 10). Specifically, s1015 may further include identifying, by the controller, a luminance difference in blocks located on both sides of the boundary, and performing compensation on a specific pixel by the luminance difference. In this regard, the identifying of the luminance difference may further include measuring luminance of the plurality of channels, normalizing the measured luminance to generate a compensation table, and identifying the luminance difference based on the generated compensation table.

Accordingly, the display device according to the embodiments may provide an autostereoscopic 3D image without a line artifact.

The above description is merely an example of the technical idea, and those skilled in the art to which the embodiments belong may make various modifications and variations without departing from the essential characteristics of the embodiments.

Accordingly, the embodiments disclosed above are not intended to limit the technical idea of the present disclosure but to illustrate, and the scope of the technical idea is not limited by the embodiments of the present disclosure.

The protection scope of the present disclosure should be construed according to the claims below, and all technical ideas within the equivalent range should be interpreted as being included in the scope of the present disclosure.

What is claimed is:

1. A display device comprising:
a sensor configured to sense a location of a user;
a display including a plurality of pixels and configured to output an image;
a barrier including a plurality of independent blocks, wherein each block includes a plurality of channels; and
a controller configured to control the sensor, the display, and the barrier,
wherein the controller is configured to:
   arrange the plurality of channels based on the location of the user;
   sense a boundary between a first block and a second block when there are the first block with the plurality of channels arranged in a first shape and the second block with the plurality of channels arranged in a second shape different from the first shape;
   calculate a location of a specific pixel corresponding to the boundary among the plurality of pixels; and
   perform correction on the specific pixel.

2. The display device of claim 1, wherein the controller is configured to perform correction on the barrier corresponding to the boundary by rearranging the plurality of channels based on the sensed boundary.

3. The display device of claim 1, wherein the controller is configured to calculate the location of the specific pixel via {(number of plurality of channels for each block)×(block number of boundary)+1}.

4. The display device of claim 1, wherein the controller is configured to:
identify a luminance difference between the first block and the second block; and
perform the correction on the specific pixel by performing compensation for the specific pixel by the luminance difference.

5. The display device of claim 4, wherein the controller is configured to measure luminance of the plurality of channels, normalize each of the measured luminance to generate a compensation table, and identify the luminance difference based on the generated compensation table.

6. A method for controlling a display device including: a display; and a barrier configured to control light irradiated onto the display and including a plurality of independent blocks, wherein each block includes a plurality of channels, the method comprising:
sensing, by a sensor, a location of a user;
sensing, by a controller, a boundary between a first block and a second block when there are the first block with the plurality of channels arranged in a first shape and the second block with the plurality of channels arranged in a second shape different from the first shape;
calculating, by the controller, a location of a specific pixel corresponding to the boundary among a plurality of pixels included in the display; and
performing correction on the specific pixel.

7. The method of claim 6, further comprising:
performing, by the controller, correction on the barrier corresponding to the boundary by rearranging the plurality of channels based on the sensed boundary.

8. The method of claim 6, wherein the controller is configured to calculate the location of the specific pixel via {(number of plurality of channels for each block)×(block number of boundary)+1}.

9. The method of claim 6, wherein the performing of the correction on the specific pixel includes:
identifying, by the controller, a luminance difference between the first block and the second block; and
performing compensation for the specific pixel by the luminance difference.

10. The method of claim 9, wherein the identifying of the luminance difference includes:
measuring luminance of the plurality of channels;
normalizing each of the measured luminance to generate a compensation table; and
identifying the luminance difference based on the generated compensation table.

* * * * *